(12) United States Patent
Jeung

(10) Patent No.: US 8,761,832 B2
(45) Date of Patent: Jun. 24, 2014

(54) METHOD AND APPARATUS FOR CONTROLLING THE UICC APPLICATION FILE

(75) Inventor: Youn-Pil Jeung, Seoul (KR)

(73) Assignee: KT Corporation, Seongnam (KR)

( * ) Notice: Subject to any disclaimer, the term of this patent is extended or adjusted under 35 U.S.C. 154(b) by 314 days.

(21) Appl. No.: 12/760,367

(22) Filed: Apr. 14, 2010

(65) Prior Publication Data

US 2010/0197350 A1  Aug. 5, 2010

Related U.S. Application Data

(63) Continuation of application No. PCT/KR2008/006026, filed on Oct. 13, 2008.

(30) Foreign Application Priority Data

Oct. 15, 2007  (KR) .......................... 10-2007-0103593

(51) Int. Cl.
  *H04M 1/00*  (2006.01)
(52) U.S. Cl.
  USPC .......................................... 455/558; 455/557
(58) Field of Classification Search
  CPC ....... H04W 88/06; H04W 8/183; H04W 8/22; H04W 48/18; G06Q 20/354; G06Q 20/105; G06Q 20/341; G06Q 20/3552; G06Q 20/357
  USPC ......... 455/558, 557, 551, 552.1, 432.1–432.3
  See application file for complete search history.

(56) References Cited

U.S. PATENT DOCUMENTS

| | | | |
|---|---|---|---|
| 6,591,116 B1 * | 7/2003 | Laurila et al. ................ | 455/558 |
| 6,961,587 B1 * | 11/2005 | Vilppula et al. .............. | 455/558 |
| 7,818,031 B2 * | 10/2010 | Laumen et al. ............... | 455/558 |
| 2003/0119552 A1 * | 6/2003 | Laumen et al. ............... | 455/557 |
| 2004/0022216 A1 * | 2/2004 | Shi .................................. | 370/335 |
| 2010/0063960 A1 * | 3/2010 | Lehto ........................... | 707/621 |

FOREIGN PATENT DOCUMENTS

| | | |
|---|---|---|
| JP | 2001-016634 | 1/2001 |
| JP | 2002-291043 | 10/2002 |
| JP | 2006-121334 | 5/2006 |
| KR | 10-2001-0007104 A | 1/2001 |
| KR | 10-2004-0106980 A | 12/2004 |
| KR | 10-2006-0073200 A | 6/2006 |
| KR | 10-2007-0025252 A | 3/2007 |
| KR | 10-2007-0092685 A | 9/2007 |

OTHER PUBLICATIONS

International Search Report for International application No. PCT/KR2008/006026 dated Jan. 22, 2009 by Korean Intellectual Property Office.
Japanese Office Action for App: 2010-528814 dated Nov. 8, 2011.

* cited by examiner

*Primary Examiner* — Chuong A Ngo

(74) *Attorney, Agent, or Firm* — Sughrue Mion, PLLC

(57) ABSTRACT

A method and an apparatus of controlling an application dedicated file included in a universal integrated chip card (UICC) in a mobile station are disclosed. In one embodiment, the method includes analyzing an element file directory (EFDIR) stored in the UICC to check whether there are a plurality of application dedicated files that perform a same function; and activating one of the plurality of application dedicated files corresponding to a predetermined execution information according to the checked result. With at least one embodiment of the present invention, one UICC can provide a plurality of USIM application files and a user can select any one of the plurality of USIM application files.

21 Claims, 9 Drawing Sheets

FIG. 4

| 2F00' | Linear fixed | | Mandatory |
|---|---|---|---|
| SFI : 1E | 2 | | |
| Record size: 50 bytes | Update activity: low | | |
| Access Conditions:<br>　　READ　　　　ALW<br>　　UPDATE　　　ADM<br>　　DEACTIVATE　ADM<br>　　ACTIVATE　　ADM | | | |
| Bytes | Description | M/O | Length |
| 1-50 | 611C4F10A0000000871002FF47F001890<br>00001FF50084B544620554943 43FFFFFF<br>FFFFFFFFFFFFFFFFFFFFFFFFFFFFFFFF<br>FFFFFFFFFFFFFFFFFFFFFFFFFFFFFFFF<br>FFFFFFFFFFFFFFFFFFFFFFFFFFFFFFFF<br>FFFFFFFFFFFFFFFFFFFFFFFFFFFFFFFF<br>FFFFFFFFFFFFFFFFFFFFFFFFFFFFFFFF<br>FFFFFFFFFF | M | 50 bytes |
| 1-50 | 611C4F10A0000000871002FF47F001890<br>000011F50084B544620554943 43FFFFFF<br>FFFFFFFFFFFFFFFFFFFFFFFFFFFFFFFF<br>FFFFFFFFFFFFFFFFFFFFFFFFFFFFFFFF<br>FFFFFFFFFFFFFFFFFFFFFFFFFFFFFFFF<br>FFFFFFFFFFFFFFFFFFFFFFFFFFFFFFFF<br>FFFFFFFFFFFFFFFFFFFFFFFFFFFFFFFF<br>FFFFFFFFFF | M | 50 bytes |

410, 440, 420, 400, 430, 450, First record 470, Second record 480

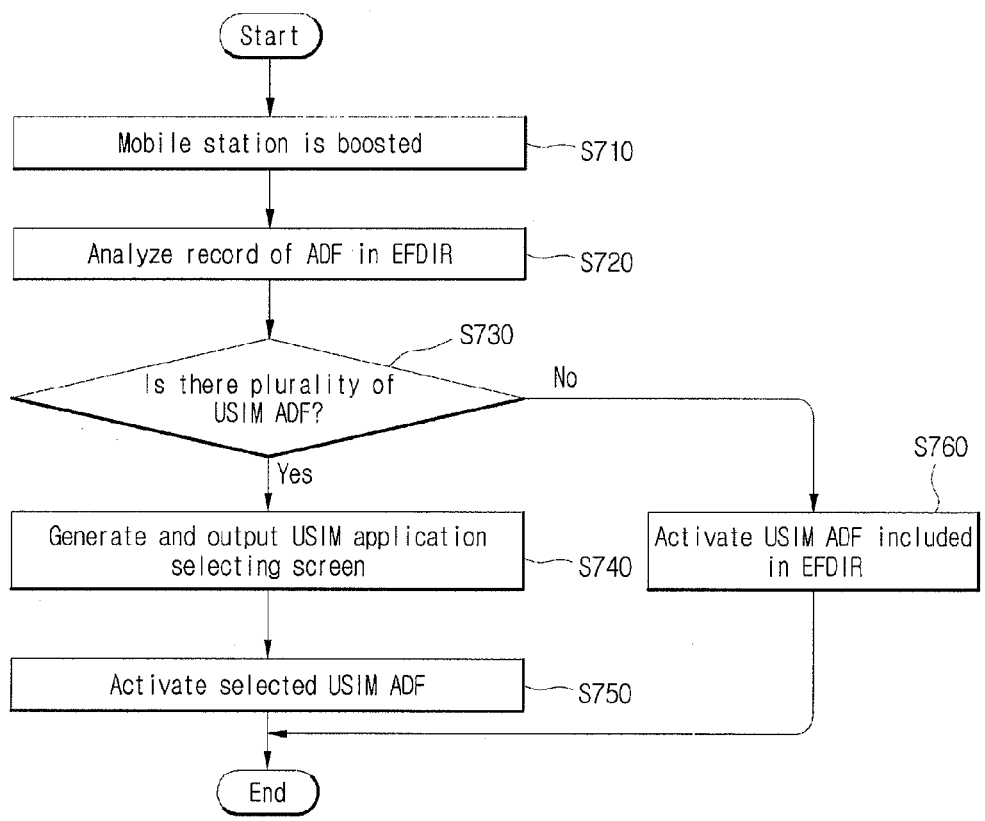

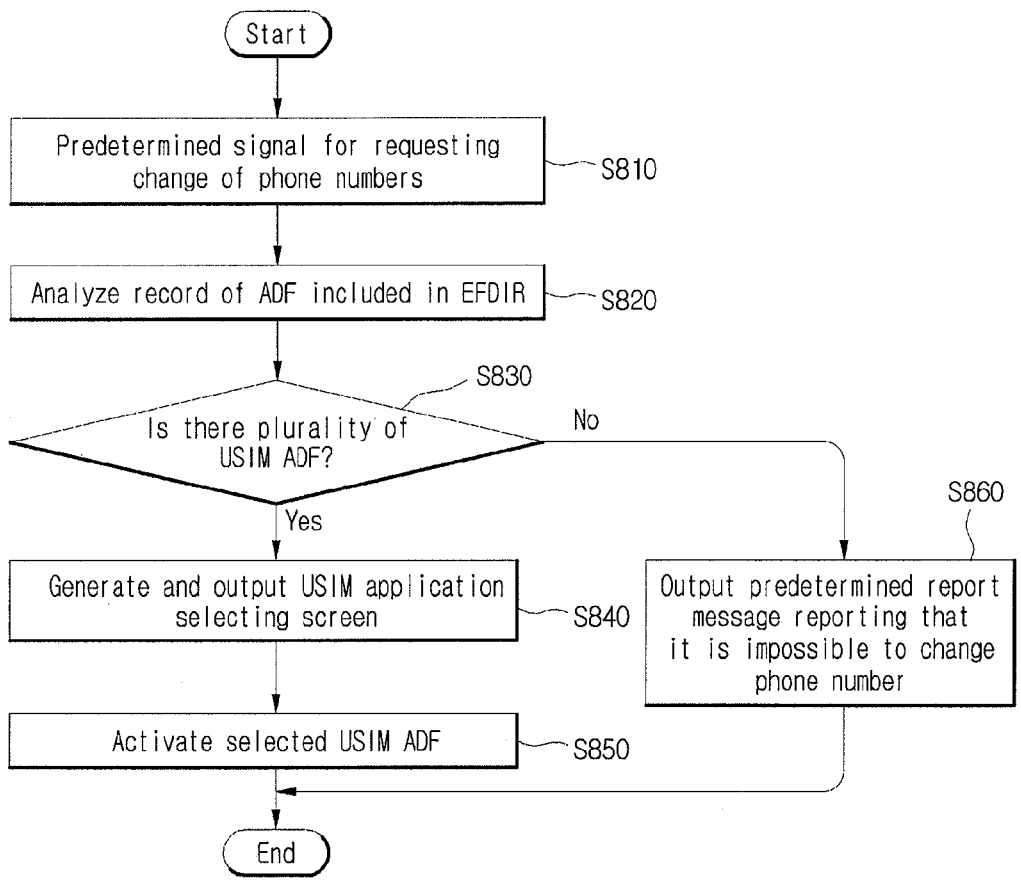

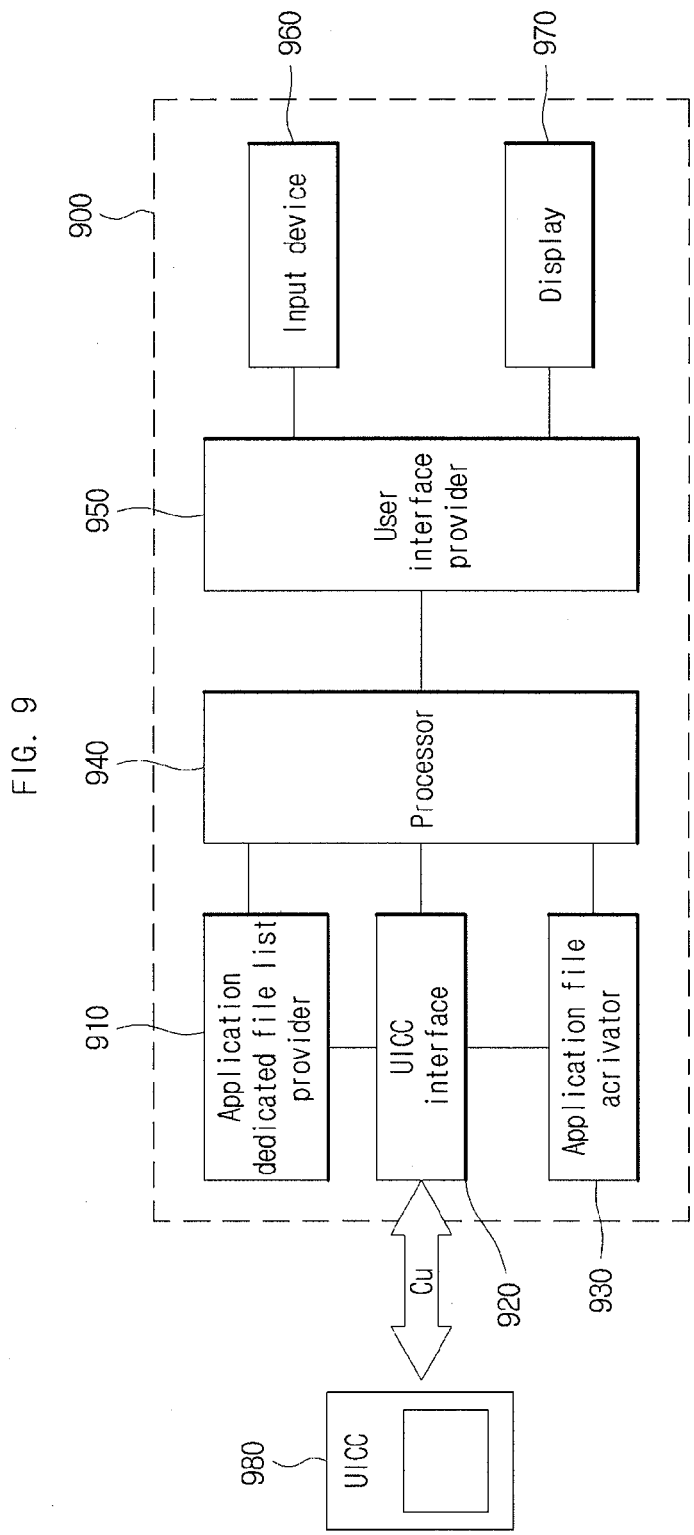

U S 8,761,832 B2

METHOD AND APPARATUS FOR CONTROLLING THE UICC APPLICATION FILE

CROSS-REFERENCE TO RELATED APPLICATIONS

This application is a continuation application, and claims the benefit under 35 U.S.C. §§120 and 365 of PCT Application No. PCT/KR2008/006026, filed on Oct. 13, 2008, which is hereby incorporated by reference. PCT/KR2008/006026 also claimed priority from Korean Patent Application No. 10-2007-0103593, filed on Oct. 15, 2007, which is hereby incorporated by reference.

BACKGROUND OF THE INVENTION

1. Field of the Invention

The present invention relates to method and apparatus for controlling a universal integrated chip card (UICC) application file, more specifically to a UICC file structure that can selectively use a plurality of phone numbers by using one UICC and a method for controlling an application dedicated file in a mobile station using the same.

2. Description of the Related Technology

A universal subscriber identity module card (hereinafter, referred to as an "USIM card"), which is the asynchronous third-generation mobile communication (e.g. an attachable smart card to be inserted into a WCDMA apparatus), can typically provide various functions such as user authentication, international roaming, and electronic commerce.

SUMMARY OF CERTAIN INVENTIVE ASPECTS

One aspect is a method of controlling an application dedicated file (ADF) included in a universal integrated chip card (UICC) in a mobile station. In one embodiment, one UICC can allot a plurality of different international mobile subscriber identities (IMSIs) and mobile subscriber ISDN numbers (MSISDNs) through a UICC application file having a structure capable of having a plurality of USIM application.

The method of controlling an application dedicated file (ADF) included in a universal integrated chip card (UICC) in a mobile station can include analyzing an element file directory (EFDIR) stored in the UICC to check whether there are a plurality of application dedicated files that perform a same function; and activating an application dedicated file corresponding to a predetermined execution information according to the checked result.

Another aspect is a method of controlling an application dedicated file (ADF) included in a universal integrated chip card (UICC) in a mobile station.

In one embodiment, the method includes receiving a predetermined signal for requesting the change of a phone number through a predetermined user setting menu for selecting the application dedicated file; analyzing an element file directory (EFDIR) to check whether there are a plurality of universal subscriber identity module (USIM) application file; if there are the plurality of USIM application file as the result of checking it, outputting a phone number selecting screen having selectable first through $N^{th}$ phone numbers; and, if any one of the first through $N^{th}$ phone numbers is selected, activating a USIM application file corresponding to the selected phone number.

Another aspect is an apparatus of controlling an application dedicated file (ADF) included in a universal integrated chip card (UICC) in a mobile station.

In one embodiment, the apparatus includes an application dedicated file list provider, configured to analyze an elementary file directory (EFDIR) stored in the UICC and, if there is a plurality of application dedicated files that perform a same function, to provide an application file identifier related to the application dedicated files to a processor; the processor, configured to control a predetermined application file selecting screen, capable of user selection, to be outputted by using the application file identifier received from the application dedicated file list provider and to direct to activate a selected application dedicated file; and an application file activator, configured to activate the selected application dedicated file if a predetermined control signal for activating the selected application dedicated file is received from the processor.

Another aspect is a method of using a plurality of phone numbers in one mobile station. The method of selecting and using a plurality of phone numbers in a mobile station can include analyzing an EFDIR stored in a UICC to check whether there are a plurality of USIM application dedicated file; and activating a USIM application dedicated file corresponding to predetermined execution information according to the checked result.

Another aspect is an apparatus for controlling an application dedicated file (ADF) included in a universal integrated chip card (UICC) in a mobile station, the apparatus comprising: means for analyzing an element file directory (EFDIR) stored in the UICC to check whether there are a plurality of application dedicated files that perform the same function; and means for activating one of the application dedicated files corresponding to a predetermined execution information according to the checked result.

BRIEF DESCRIPTION OF THE DRAWINGS

FIG. 4 shows the structure of an EFDIR in accordance with an embodiment of the present invention.

FIG. 7 is a flowchart showing how an application dedicated file is selected in a mobile station in accordance with an embodiment of the present invention.

FIG. 8 is a flowchart showing how an application dedicated file is selected in a mobile station in accordance with an embodiment of the present invention.

FIG. 9 is a block diagram showing a mobile station in accordance with an embodiment of the present invention.

DETAILED DESCRIPTION OF CERTAIN INVENTIVE EMBODIMENTS

In particular, while a subscriber identity module (SIM) card used in the global system for mobile communications (GSM) simply includes subscriber information, the asynchronous second-generation mobile communication, the USIM card includes functions of a universal IC card that can provide various applications such as a fare card, a credit card, user setting information in addition to the existing functions of the SIM card. The user setting information includes a phone book, a shortcut key, and a lock key.

A logical interface of the USIM card conforms to 3GPP 31.102 and 31.101, and an identifier of a dedicate file (DF) is "7F10(Telecom)," "7F20(GSM evolved IMT2000)," "7F24 (TDMA)," or "7F25(CDMA)."

Security structure provided by the USIM card can be distinguished into authentication and access control. Here, the authentication can be distinguished into apparatus authentication and subscriber authentication. The access control refers to the control of the access to a pertinent file according to a card holder verification (CHV) 1, a card holder verification (CHV) 2, and ADM (Administration). Here, the authentication refers to the technology for determining whether adequate authority is given to a particular medium and a user in a wireless network.

In the WCDMA, an authentication function medium is the USIM card in a mobile station (MS) and an authentication center mounted in a system. Accordingly, the same key value for authentication is required in the USIM card and the authentication center to authenticate a subscriber.

Hereinafter, an authentication procedure defined by the $3^{rd}$ generation partnership project (3GPP) standard will be briefly described. Firstly, a mobile station reads an international mobile subscriber identity (hereinafter, referred to as an "IMSI") that is pre-stored in the USIM card and transmits a predetermined control signal having the IMSI to the authentication center to authenticate a subscriber.

The authentication center generates a random number and a subscriber authentication key corresponding to the received IMSI and checks whether a pertinent subscriber has the access authority to a pertinent network by using the generated subscriber authentication key and random number.

The USIM card that is attachably inserted into the mobile station typically maintains one IMSI and a mobile subscriber ISDN number (MSISDN) corresponding to the IMSI. Here, the MSISDN refers to known reference of a subscriber and typically is mobile phone number.

According to 3GPP standard, 4 MSISDNs can be allotted to one IMSI at the maximum. These are phone numbers allotted according to an application used with the pertinent IMSI. For example, an MSISDN corresponding to a certain IMSI can be divided into a first MSISDN for a typical phone communication and a second MSISDN for a fax communication.

However, the above system does not provide the method of storing a plurality of IMSIs in one USIM card.

Figure 1:
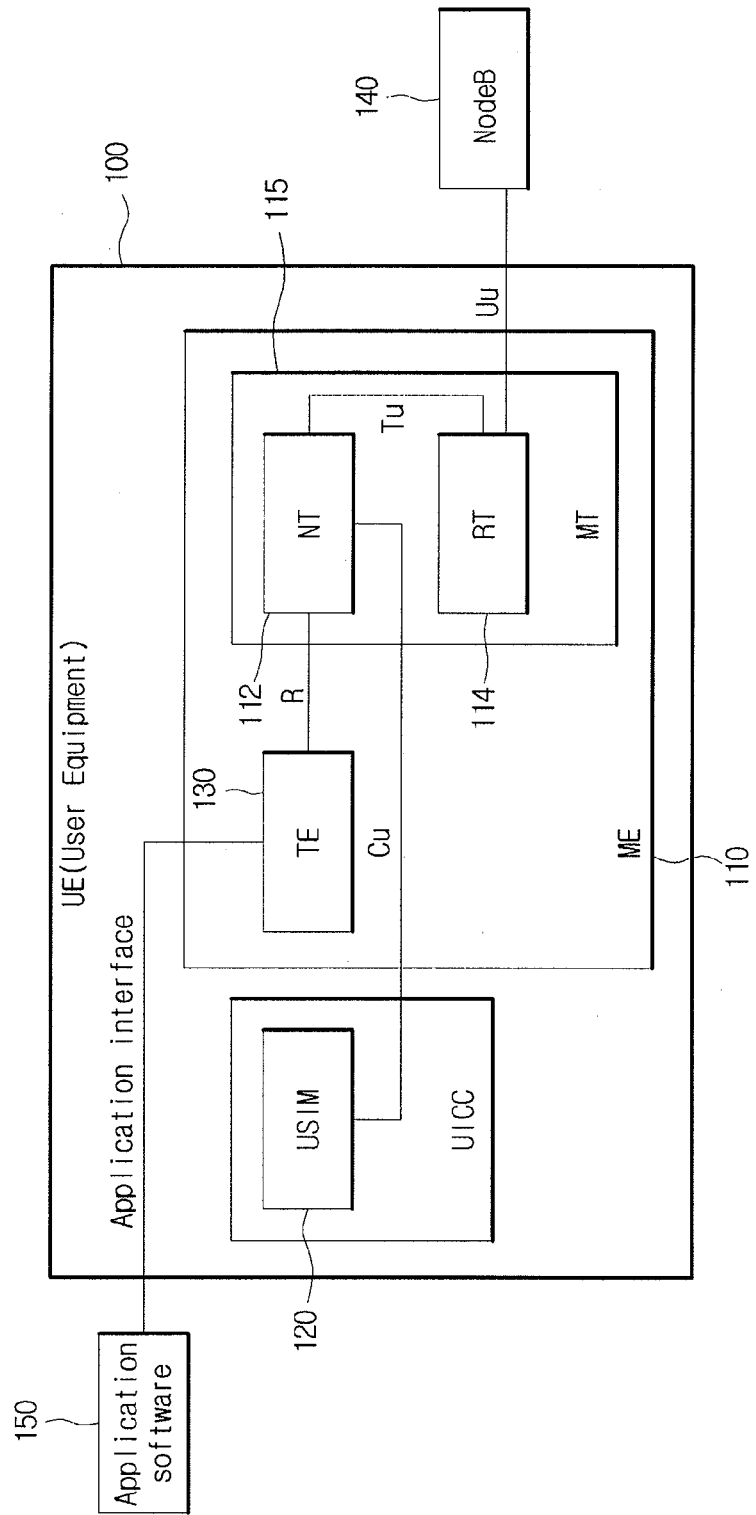
FIG. 1 is a block diagram showing the structure of an UE in an UMTS system.

FIG. 1 is a block diagram showing the structure of an UE in an UMTS system.

In the 3GPP standard, a mobile station is called user equipment (UE), and a typical base station is a Node B. Hereinafter, the mobile station and the base station are called UE and Node B, respectively, for the convenience of description.

Referring to FIG. 1, the UE 100 is distinguished into a mobile equipment (ME) 110 and an UMTS-universal mobile telecommunications system-subscriber identity module (USIM) 120. Since the USIM 120 is typically separated from the ME 110 physically, a standard interface Cu is defined between the USIM 120 and the ME 110. Here, the ME 110 includes a terminal equipment (TE) 130, a network termination (NT) 112, and a radio termination (RT) 114. The NT 112 and the RT 114 receive and transmit information from and to each other through an interface Tu.

As shown in FIG. 1, the NT 112 can communicate with the USIM 120 and the TE 130 through the interface Cu and an interface R, respectively.

In the UMTS, an interface for radio sections is referred to as an interface Uu. The RT 114 can transmit or receive a wireless signal to or from the Node B 140 through the interface Uu.

The USIM 120 is an element for storing user's inherent information and usually has an integrated circuit (IC) card that is physically attachable to a side of the UE 100. The USIM 120 can provide various applications, such as banking, phone book, and paying transportation fares, and communications corresponding to a variety of wireless access technology. Accordingly, the USIM 120 is often called a universal IC card (UICC).

Contents of the USIM 120 are typically supplied from a service provider. The contents of the USIM 120 can also include subscriber inherent information stored in a home location register (HLR) of a core network. Hereinafter, basic information that can be stored in the USIM 120 will be described in detail.

Firstly, the USIM 120 can maintain international mobile subscriber identity (IMSI), access class information, and encoding algorithm, which is basic information determined by an USIM manufacturing company and a service provider.

The USIM 120 can include a location identity, such as a location area identity and a routing area identity, a temporary mobile subscriber identity (TMSI), and an encoding parameter as information for the mobility of a mobile station. It can be also possible to maintain information related to service types that are accessible to through pertinent USIMs.

Moreover, the USIM 120 can maintain its own execution program for executing various programs and store user data such as short messages, dialing information, and phone book, which are personally used by a user.

The ME 110 is a mobile station which processes an actual communication with a radio access network and divided into a mobile terminal 115 and the TE 130.

The MT 115 has a radio access protocol for communicating with a mobile communication system in radio sections. For the UE 100, the MT 115 is an actual, physical terminal device, which is capable of communication in a UMTS terrestrial radio access network (UTARN) area only, where the same radio access technology is used.

The TE 130 provides control functions necessary for the operations of radio access protocols. For example, the TE 130 can provide an environment in which a wireless apparatus connected to a laptop computer can function as a wireless modem. Moreover, the TE 130 can control a terminal termination by using a modem control command set such as AT command, which is defined by the international telecommunication union—telecommunication standardization sector (ITU-T). Here, the terminal termination includes the NT 112 and the RT 114.

Figure 2:
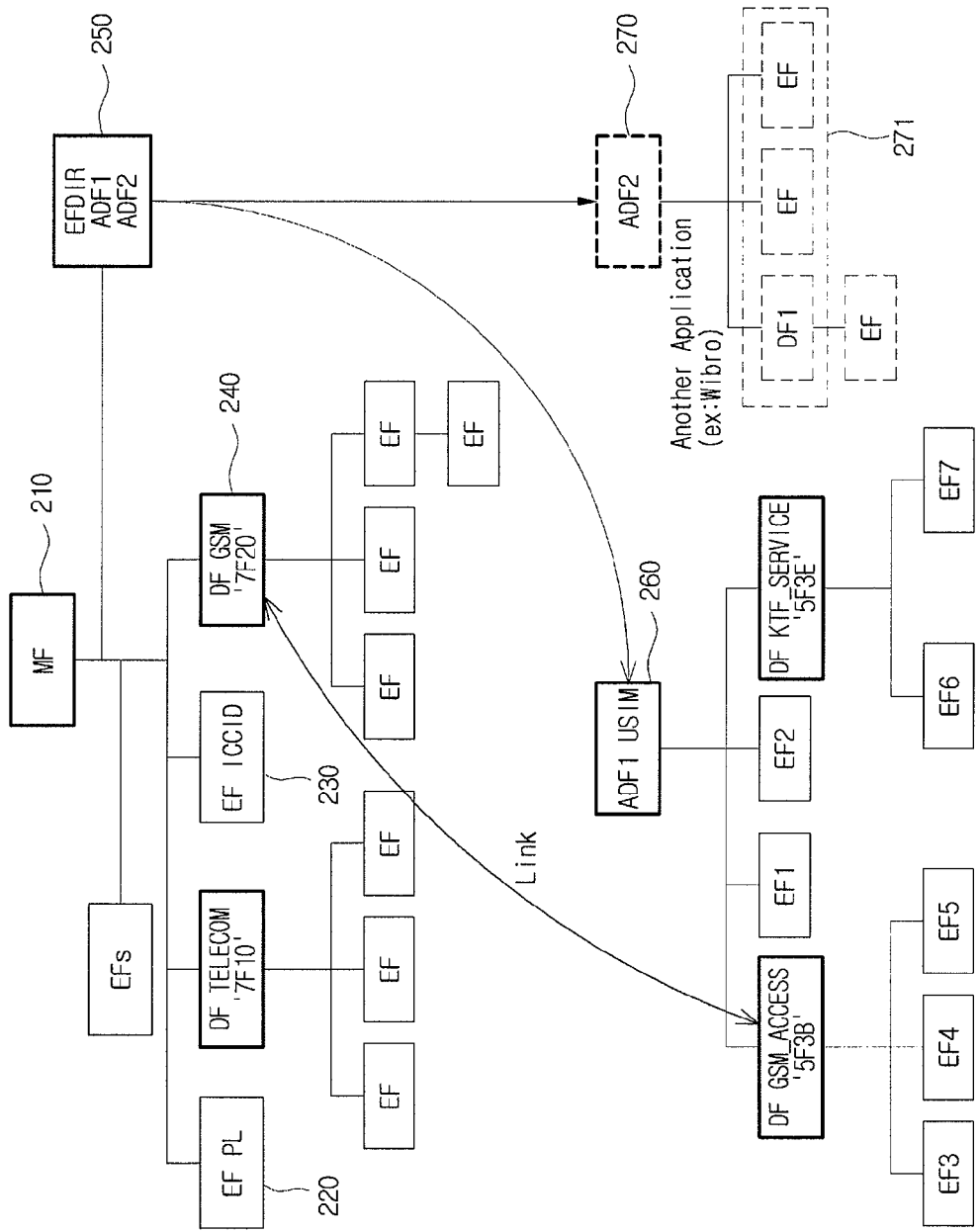
FIG. 2 shows an application of a typical UICC and a corresponding file structure.

FIG. 2 shows an application of a typical UICC and a corresponding file structure.

As shown in FIG. 2, a logical file structure of UICC generally includes one master file (MF) and an essential file for a basic operation of the UE 100. Here, the essential file includes an EFPL 220, an EFICCID 230, and an elementary file directory (EFDIR) 250.

Here, information included in the EFPL 220 can be used for a man machine interface (MMI) by the ME 110.

A typical UICC can also include a USIM application for providing a WCDMA service, a GSM application for GSM roaming and a UIM application for CDMA roaming. As such, the list of various application files that can be provided through one UICC can be managed through the EFDIR 250.

Referring to FIG. 2, the EFDIR 250 has information related to two application dedicated files-an ADF1 260 and an ADF2

270. Here, the ADF1 260 can be an application dedicated file related to the USIM, and the ADF2 270 can be an application dedicated file corresponding to another radio access type (e.g. Wibro).

Below described is the relationship between a master file, an application dedicated file (ADF), a dedicated file (DF), and an elementary file (EF).

A predetermined file identifier (hereinafter, referred to as a FID) for identifying a pertinent file is allotted to each of the aforementioned files. Here, the FID is represented in hexadecimals and has two Bytes. Referring to FIG. 2, the FID of the dedicated file 240 for the GSM service is defined as "7F20."

Firstly, the master file 210, which is a root directory of the UICC file structure, can have at least one dedicated file and the elementary file. Here, the dedicated file includes the application dedicated file.

The elementary file can have a file structure of minimum unit to store data. The elementary file can be also distinguished into a transparent elementary file, a linear fixed elementary file, and a cyclic elementary file, according to a data storing type.

The transparent elementary file has a structure storing one record, and the linear fixed elementary file has a structure successively storing a plurality of records having a fixed size. Here, for the linear fixed elementary file, an EFSMS for storing a short message is popular.

The cyclic elementary file has a structure which successively stores data, and if the last record of an area allotted for the pertinent file is filled up, overwrites the remaining data in the first record. In other words, the structure of the cyclic elementary file can correspond to that of a typical circular queue. For example, for the cyclic elementary file, an outgoing call information elementary file (EFOCI) and an incoming call information elementary information (EFICI), for writing an outgoing call record and an incoming call record, respectively, are popular.

The dedicated file can form a functional group and be constructed to include sub-dedicated file and the elementary file. In other words, the dedicated file can be formed as the elementary file of the same group per application and a group of the elementary file. For example, referring to the reference numeral 271, the ADF2 270 is constructed to include one dedicated file (i.e. the DF1) and two elementary files. Here, the dedicated file includes the application dedicated file.

Typically, the FID of a file to be included in the UICC is pre-defined by the international standard. Hereinafter, the FID pre-defined by the international standard is referred to as a "reserved FID."

A file identifier defined by a provider can be allotted to the application dedicated file included in the EFDIR 250. At this time, if the file identifier allotted for the application dedicated file is identical to any one of the file identifiers defined by the international standard, there may be a problem that an unexpected application is performed. An additional application identifier (AID) can be allotted to the application dedicated file to avoid the conflict of the aforementioned file identifiers.

Figure 3:
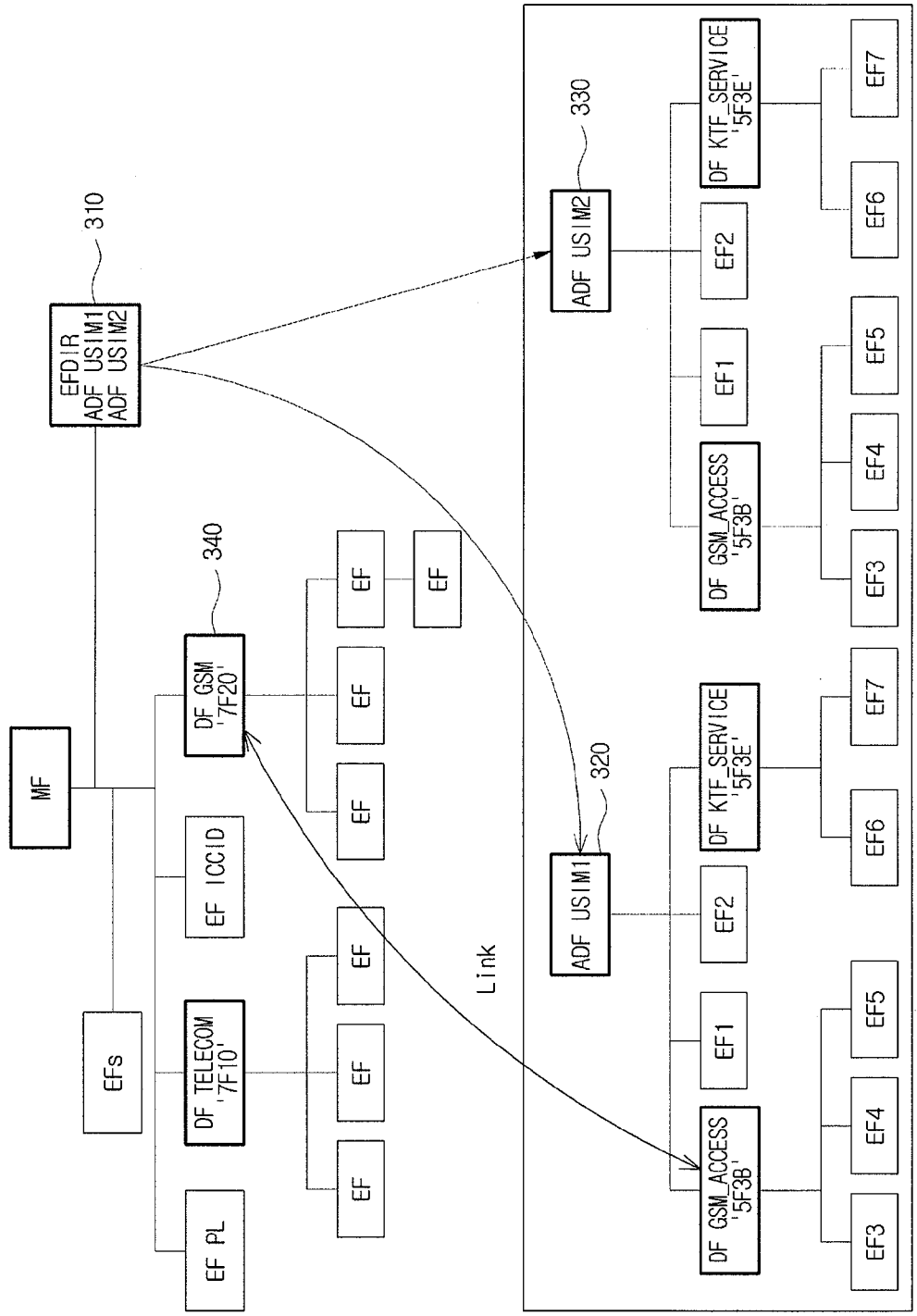
FIG. 3 shows the file structure of an UICC supporting a plurality of USIM applications in accordance with an embodiment of the present invention.

FIG. 3 shows the file structure of an UICC supporting a plurality of USIM applications in accordance with an embodiment of the present invention.

As shown in FIG. 3, in order for one UICC to provide a plurality of USIM applications, an EFDIR 310 can include information related to two USIM application dedicated files that provide the same service. In this embodiment of the present invention, it is assumed that there are two USIM application files for the convenience of description. It shall be evident to any person of ordinary skill in the art, however, that the number of USIM application dedicated files providing the same application service physically is not limited two and one UICC can have more application dedicated files.

Hereinafter, two USIM application dedicated files included in the EFDIR 310 are referred to as an "ADFUSIM1 320" and an "ADFUSIM2 330," respectively, for the convenience of description. Here, the ADFUSIM1 320 and the ADFUSIM 330 can be selected by using the information included in the EFDIR 310 and the application identifier that is inherently allotted per application file.

If no information is included in the EFDIR, or there is no USIM application, the ME 110 can select a GSM application dedicated file 340. The USIM application dedicated file typically includes an elementary file (hereinafter, referred to as an "EFIMSI") for storing an international mobile subscriber identity (IMSI) and an elementary file (hereinafter, referred to as an "EFMSISDN") for storing a mobile subscriber ISDN number.

In accordance with at least one embodiment of the present invention, it is considered as one of good examples that the EFIMSI and the EFMSISDN of the ADFUSIM1 320 and the ADFUSIM2 330 have different values. For example, the UICC according to one embodiment of the present invention can include two USIM application files having different ISMIs and MSISDNs. Accordingly, a user using a mobile station can select a desired USIM application and receive a desired service by using a phone number corresponding to the selected USIM application.

In another embodiment of the present invention, a phone book that is dependent on the selected phone number is provided. The UICC includes a plurality of phone book elementary files, and each of the phone book elementary files is connected to a plurality of USIM application dedicated files. Accordingly, the user is provided with contact information stored in a phone book elementary file connected to the selected USIM application dedicated file.

Hitherto, the method of using one mobile station for a plurality of phone numbers by allowing the EFDIR 310 to maintain the information related to a plurality of USIM application dedicated files and a user to select one of the USIM application dedicated file has been described. This method is not limited to the USIM application. It is noted that the method can be applied to another application such as an application related to Wibro, GSM, and CDMA.

FIG. 4 shows the structure of an EFDIR in accordance with an embodiment of the present invention.

As shown in FIG. 4, an EFDIR 400 can be constructed to include a file-identifier field 410, a file-structure field 420, a record-number field 430, a record-size field 440, an access-authority field 450, and a record area 460.

According to the standard defined in 3GPP 31.102 characteristics of the universal subscriber identity module (USIM) application, a file identifier of the EFDIR 400 is hard-coded as "2F00," and the data structure of the record area 460 is a linear fixed structure.

The record-number field 440 is a field for storing the number of records included in the EFDIR 400, and the record-size field 450 is a field for storing the size of data in a unit of byte, which can be stored per record.

The access-authority field 450 is a field for controlling the access authority to the EFDIR 400. In particular, the access-authority field 450 is a field for determining the access authority to control commands such as READ, UPDATE, DEACTIVATE, AND ACTIVATE.

The record area 460, which is an area for storing data corresponding to the application dedicated file, can include at least one record.

Referring to FIG. 4, if a value stored in the record-number field is 2, the record area 460 includes two records.

Hereinafter, the two records included in the record area 460 in accordance with this embodiment of the present invention are referred to as a first record 470 and a second record 480, respectively.

In accordance with at least one embodiment of the present invention, the EFDIR 400 can include a plurality of records of the same application types. It is noted that a pertinent record can be distinguished through an application identifier that is inherently allotted per application dedicated file. If the EFDIR 400 includes the first record 470 and the second record 480, corresponding to the USIM application, it is considered as one of good examples that an inherent application identifier is allotted to each of the USIM applications.

Accordingly, the ME 110 can recognize a plurality of USIM applications by using the application identifier and allow a user to select a phone number to be used.

Figure 5:
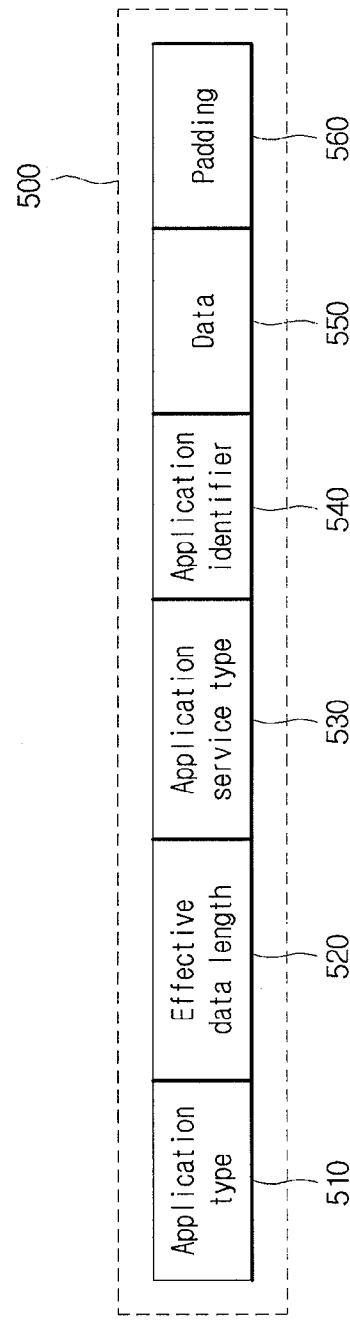
FIG. 5 shows the structure of a record of an EFDIR in accordance with an embodiment of the present invention.

FIG. 5 shows the structure of a record of an EFDIR in accordance with an embodiment of the present invention.

As shown in FIG. 5, each record 500 included in the EFDIR 400 can have at least one of an application type field 510, an effective data length field 520, an application service type field 530, an application identifier field 540, a data field 550, and a padding field 560.

The application type field 510, in which an identifier for recognizing which application is related to a pertinent record, can write identity information that is inherently allotted per application by a service provider. For example, the application type field 510 can have the length of 1 byte. The USIM application, the GSM application, the CDMA application, and the Wibro application can be defined as "0x01," "0x02," "0x03," and "0x04," respectively.

The effective data length field 520 is a field for writing the length of the remaining effective data except for the length of data allotted to the application type field 510.

The application service type field 530 is a field in which a service identifier for recognizing a service that can be provided per application is stored. For example, a service provider can provide various differentiated services for the USIM application as compared with another service provider. Accordingly, it is possible to define an inherent service identifier for recognizing various services. For example, a multimedia message service (MMS) and a text conversion service can be defined as "0x10" and "0x20," respectively.

If the EFDIR 400 has a plurality of application dedicated files having identical application types, the application identifier 540 stores identity information for recognizing the pertinent application dedicated file. The application identifier 540 can also be used to recognize the application dedicated file having the same application type and the same application service type.

The data field 550 is a field for writing various items of information related to the pertinent application. The padding field 560 is a field for filling with a predetermined pattern (e.g. all "0xff") in an ineffective area of areas allotted per record.

In accordance with at least one embodiment of the present invention, it is considered as one of good examples that the ME 110 can activate the pertinent application by directly selecting the application identifier 540 included in a record of the EFDIR 400.

Figure 6:
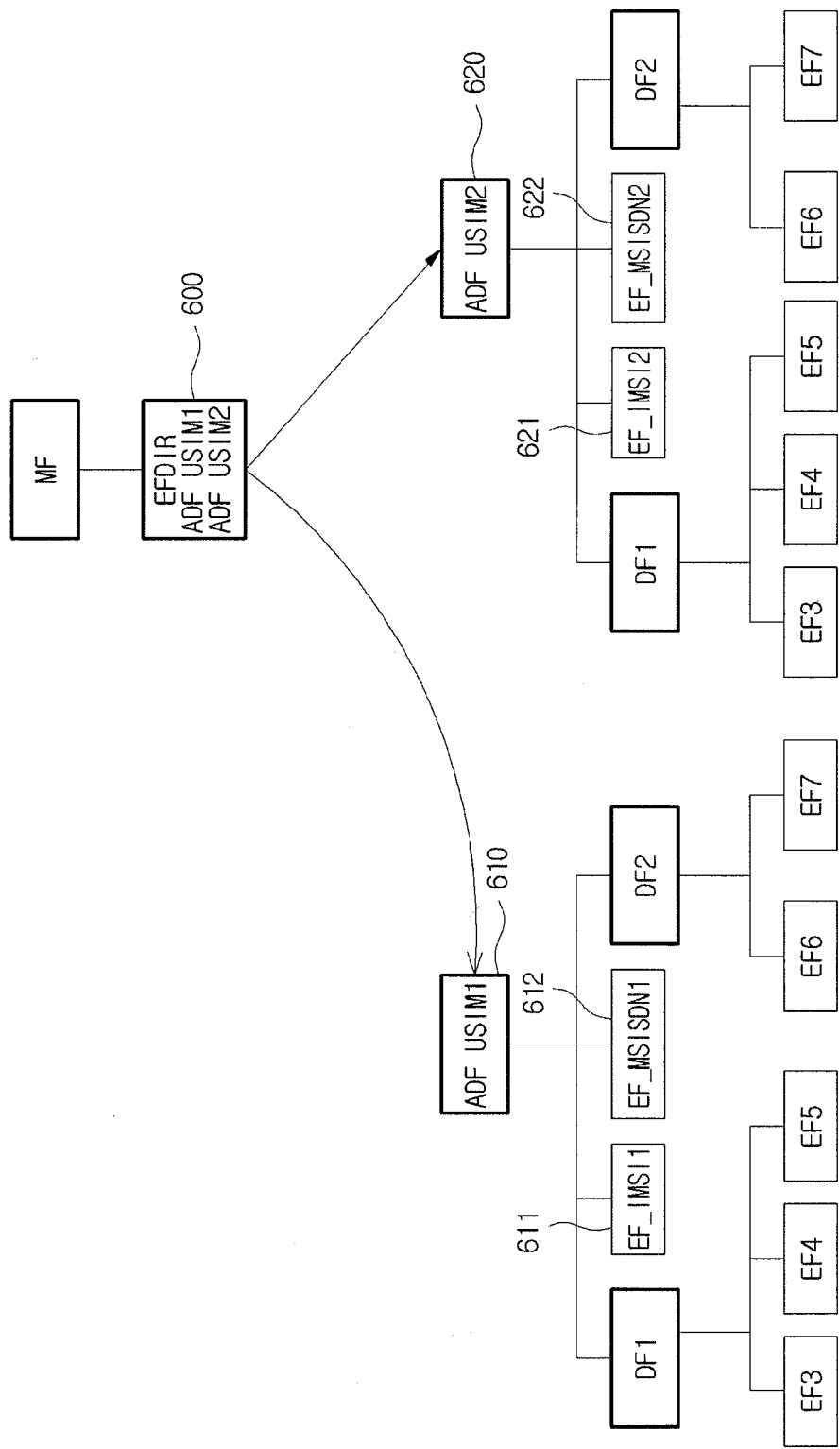
FIG. 6 shows a file structure for supplying an identical type application in one UICC in accordance with an embodiment of the present invention.

FIG. 6 shows a file structure for supplying an identical type application in one UICC in accordance with an embodiment of the present invention As shown in FIG. 6, the EFDIR 500 in accordance with this embodiment of the present invention can store information related to an ADFUSIM1 610 and an ADFUSIM 620.

Here, different IMSI and MSISDN values can be allotted to and stored in elementary files 611 and 621 (hereinafter, referred to as "EFIMST) storing an IMSI of the USIM application file and elementary files 612 and 622 (hereinafter, referred to as "EFMSISDN") storing an MSISDN of the USIM application file, respectively. Hereinafter, the IMSI and the MSISDN stored in the EFIMST and the EFMSISDN, corresponding to the ADFUSIM1 610, are referred to as a "first IMST" and a "first MSISDN," respectively, and the IMSI and the MSISDN stored in the EFIMST and the EFMSISDN, corresponding to the ADFUSIM2 620, are referred to as a "second IMST" and a "second MSISDN," respectively.

Accordingly, if there is an application file of the same type, an ME 610 in accordance with an embodiment of the present invention can use one UICC to provide a plurality of phone numbers by allowing a user to select the pertinent application file with reference to the information (e.g. the record information of FIG. 5). Here, the application identifiers 540 of the pertinent application file are different from each other.

FIG. 7 is a flowchart showing how an application dedicated file is selected in a mobile station in accordance with an embodiment of the present invention Referring to FIG. 7, if a mobile station is booted (S710), the ME 110 accesses a UICC to analyze a record included in an EFDIR (S720).

The ME 110 checks whether the EFDIR has a plurality of USIM application dedication files through the analyzing of the record (S730).

As the result of checking it, if the EFDIR has the plurality of USIM application dedication files, the ME 110 generates a predetermined USIM application selecting screen and outputs the generated screen to a display (S740). Here, it is considered as one of good examples that the USIM application selecting screen includes MSISDN allotted per USIM application dedicated file.

Thereafter, the ME 110 activates a USIM application dedicated file corresponding to the MSISDN selected by a user (S750).

In the operation represented by S730, if the EFDIR does not have the plurality of USIM application dedication files, the ME 110 activates the USIM application dedicated file included in the EFDIR (S760).

In accordance with an embodiment of the present invention, if there is no information corresponding to the USIM application dedicated file in the record in the EFDIR, it is considered as one of good examples that the ME 110 activates a dedicated file of another radio access type (e.g. GSM, CDMA, and Wibro) in a predetermined priority order.

In accordance with this embodiment of the present invention, in case that the EFDIR has the information related to the plurality of USIM application dedicated files, the processing method has been described. It shall be evident to any person of ordinary skill in the art, however, that the same or similar method can be applied to another application dedicated file.

FIG. 8 is a flowchart showing how an application dedicated file is selected in a mobile station in accordance with an embodiment of the present invention.

In more detail, FIG. 8 is a flowchart showing how an application dedicated file is selected through a predetermined user setting menu in a mobile station.

Referring to FIG. 8, if a predetermined signal for requesting the change of phone numbers (S810), the ME 110 accesses a UICC to analyze a record of an application dedicated file stored in an EFDIR (S820).

The ME 110 checks whether the EFDIR has a plurality of USIM application dedication files through the analyzing of the record (S830).

As the result of checking it, if the EFDIR has the plurality of USIM application dedication files, the ME 110 generates a predetermined USIM application selecting screen and outputs the generated screen to a display (S840). Here, it is considered as one of good examples that the USIM application selecting screen includes an MSISDN allotted per USIM application dedicated file.

Thereafter, the ME 110 activates a USIM application dedicated file corresponding to the MSISDN selected by a user (S850).

In the operation represented by S730, if the EFDIR does not have the plurality of USIM application dedication files, or there is the currently activated USIM application dedicated file only, the ME 110 generates a predetermined report message reporting that it is impossible to change the phone number and outputs the report message to a display (S860).

FIG. 9 is a block diagram showing a mobile station in accordance with an embodiment of the present invention.

Referring to FIG. 9, a mobile station 900 in accordance with an embodiment of the present invention can include an application dedicated file list provider 910, a UICC interface 920, an application file activator 930, a processor 940, a user interface provider 950, an input device 960, and a display 970.

The UICC interface 920 provides a communication interface with a UICC 980 according to a Cu interface standard.

The application dedicated file list provider 910 checks whether there is an application dedicated file having the same application type 510 and the same application service type 530 with reference to an EFDIR stored in the UICC, according to a control signal of the processor 940. Here, the checked result can be transferred to the processor 940, and if there are the plurality of application dedicated files having the same application type 510 and the same application service type 530, the processor 940 can request the user interface provider 950 to output a predetermined application file selecting screen.

According to the request of the processor 940, the user interface provider 950 can generate an application file selecting screen to output it to the display 970 or receive a user input signal from the input device 960 to transfer the received user input signal to the processor 940.

Here, it is considered as one of good examples that the user input signal includes a predetermined application file identifier for recognizing an application selected by a user. Here, any application file identifier will serve the purpose as long as it can recognize a pertinent application file, and the application file identifier can be an MSISDN, an IMSI, or an AID, for example.

The processor 940 transfers a predetermined control signal (hereinafter, referred to as an "activation request signal") for activating an application file selected by user to the application file activator 930.

If the activation request signal is received, the application file activator 930 accesses a UICC 980 to inactivate the currently activated application file and then activates an application file selected by a user.

In accordance with an embodiment of the present invention, if a user selects a predetermined user setting menu for changing an IMSI to be used, the processor 940 can transmit a predetermined USIM application file analysis requesting signal for requesting the analysis of a USIM application file to the application dedicated file list provider 910.

If the USIM application file analysis requesting signal is received, the application dedicated file list provider 910 analyzes a record of an EFDIR to check whether there is an inactivated USIM application file.

As the result of checking it, if there is the inactivated USIM application file, the application dedicated file list provider 910 transmits an MSISDN corresponding to the pertinent USIM application file to the processor 940.

If the processor 940 transmits the MSISDN, received from the application dedicated file list provider 910, to the user interface provider 950, the user interface provider 950 generates a predetermined phone number selecting screen and outputs it to the display 970.

If a predetermined control signal including the MSISDN selected by a user is received from the user interface provider 950, the processor 940 transmits a predetermined control signal (hereinafter, referred to as a "phone number change requesting signal) of directing to activate a USIM application file corresponding to the selected MSISDN to the application file activator 930.

If the phone number change requesting signal is received, the application file activator 930 inactivates the currently activated USIM application file and then activates a USIM application file corresponding to the MSISDN selected by a user.

Hitherto, although some embodiments of the present invention have been shown and described for the above-described objects, it will be appreciated by any person of ordinary skill in the art that a large number of modifications, permutations and additions are possible within the principles and spirit of the invention, the scope of which shall be defined by the appended claims and their equivalents.

What is claimed is:

1. A method of controlling an application dedicated file (ADF) included in a universal integrated chip card (UICC) in a mobile station, the method comprising:

analyzing an element file directory (EFDIR) stored in the UICC to check whether there are a plurality of application dedicated files including a first application dedicated file which performs a first function and at least a second application dedicated file which performs same function as the first function, wherein each of the first application dedicated file and the at least the second application dedicated file comprises a respective unique international mobile subscriber identity (IMSI), wherein the UICC supports a single radio access type; and activating one of the application dedicated files corresponding to predetermined execution information according to the checked result.

2. The method of claim 1, wherein the application dedicated files comprise:

a first USIM application dedicated file, including an elementary file (EFIMSI-1) storing a first IMSI and an elementary file (EFMSISDN-1) storing a first mobile subscriber ISDN number (MSISDN-1) connected to the first IMSI; and a second USIM application dedicated file, including an elementary file (EFIMSI-2) storing a second IMSI and an elementary file (EFMSISDN-2) storing a second mobile subscriber ISDN number (MSISDN-2) connected to the second IMSI.

3. The method of claim 2, wherein the UICC further comprises a plurality of phone book elementary files that are connected to the application dedicated files, respectively.

4. The method of claim 1, wherein, based on determining that there are application dedicated files that perform the same function, the execution information is determined by i) outputting a predetermined application dedicated file, ii) selecting screen including first through Nth application file identifiers and iii) selecting any one of the first through Nth application file identifiers.

5. The method of claim 4, wherein the application file identifier included in the application dedicated file selecting screen comprises at least one of a mobile subscriber ISDN number (MSISDN), an application type, an application service type, and an application identifier and wherein based on the determined execution information, a corresponding telephone number and a corresponding phone book information are selected said telephone number and phone book are different based on the selection of one of the first through Nth application file identifiers.

6. The method of claim 4, wherein the application file identifier included in the application dedicated file selecting screen comprises at least one of a mobile subscriber ISDN number (MSISDN), an application type, an application service type, and an application identifier.

7. The method of claim 4, wherein based on the determined execution information, a corresponding telephone number and a corresponding phone book information are selected said telephone number and phone book are different based on the selection of one of the first through Nth application file identifiers.

8. The method of claim 1, wherein the EFDIR comprises a record corresponding to at least one application dedicated file, and wherein the EFDIR, using the application type and the application service identifier included in the record, recognizes whether there are the application dedicated files that perform the same function.

9. The method of claim 8, wherein the record comprises an application identifier, and wherein using the application identifier the application dedicated files that perform the same function are distinguished.

10. The method of claim 1, wherein the application dedicated file comprises a USIM application dedicated file, wherein the USIM application dedicated file comprises an EFIMSI file, storing the IMSI, and an EFMSISDN file, storing an MSISDN, and wherein the IMSI and the MSISDN that are allotted to per USIM application dedicated file are different from each other.

11. The method of claim of 1, wherein, based on determining that there are no application dedicated files that perform the same function, the mobile station is configured to activate a dedicated file of another radio access type in a predetermined priority order.

12. The method of claim of 11, wherein the single access type is a selected one of universal mobile telecommunications system (UMTS), GSM, CDMA, WCDMA and Wibro, and wherein the other radio access type is one of the remaining access types.

13. An apparatus for controlling an application dedicated file (ADF) included in a universal integrated chip card (UICC) in a mobile station, the apparatus comprising:
an application dedicated file list provider configured to analyze an elementary file directory (EFDIR) stored in the UICC and, based on determining that there are a plurality of application dedicated files including a first application dedicated file which performs a first function and at least a second application dedicated file which performs same function as the first function wherein each of the first application dedicated file and the at least the second application dedicated file comprises a respective unique international mobile subscriber identity (IMSI), to provide an application file identifier related to the application dedicated files wherein the UICC supports a single radio access type;
a processor configured to control a predetermined application file selecting screen, configured to perform user selection, to be outputted by using the application file identifier received from the application dedicated file list provider and to direct to activate a selected application dedicated file; and
an application file activator configured to activate the selected application dedicated file if a predetermined control signal for activating the selected application dedicated file is received from the processor.

14. The apparatus of claim 13, wherein the application dedicated file list provider is further configured to i) analyze the EFDIR and, if there is an inactivated application dedicated file that performs the same function as a currently activated application dedicated file, and ii) provide an application file identifier of the inactivated application dedicated file to the processor.

15. The apparatus of claim 13, wherein the EFDIR comprises a record corresponding to at least one application dedicated file, and using the application type and the application service identifier included in the record recognizes whether there is the application dedicated file that performs the same function.

16. The apparatus of claim 15, wherein the record comprises an application identifier, and wherein using the application identifier the application dedicated files that perform the same function are distinguished.

17. The apparatus of claim 13, wherein the application file identifier included in the application dedicated file selecting screen comprises at least one of a mobile subscriber ISDN number (MSISDN), an application type, an application service type, and an application identifier.

18. The apparatus of claim 13, wherein, based on determining that there are no application dedicated files that perform the same function, the mobile station is configured to activate a dedicated file of another radio access type in a predetermined priority order.

19. The apparatus of claim of 18, wherein the single access type is a selected one of universal mobile telecommunications system (UMTS), GSM, CDMA, WCDMA and Wibro, and wherein the other radio access type is one of the remaining access types.

20. The apparatus of claim 13, wherein the application file identifier included in the application dedicated file selecting screen comprises at least one of a mobile subscriber ISDN number (MSISDN), an application type, an application service type, and an application identifier and wherein based on the determining that there are application dedicated files that perform the same function, a corresponding telephone number and a corresponding phone book information are selected such that said telephone number and phone book are different based on a selection of one of first through Nth application file identifiers.

21. An apparatus for controlling an application dedicated file (ADF) included in a universal integrated chip card (UICC) in a mobile station, the apparatus comprising:
means for analyzing an element file directory (EFDIR) stored in the UICC to check whether there are a plurality of application dedicated files including a first application dedicated file which performs a first function and at least a second application dedicated file which performs same function as the first function, wherein each of the first application dedicated file and the at least the second application dedicated file comprises a respective unique international mobile subscriber identity (IMSI) wherein the UICC supports a single radio access type;
and means for activating one of the application dedicated files corresponding to predetermined execution information according to the checked result.

* * * * *